United States Patent [19]
Manthiram et al.

[11] Patent Number: 5,431,967
[45] Date of Patent: * Jul. 11, 1995

[54] SELECTIVE LASER SINTERING USING NANOCOMPOSITE MATERIALS

[75] Inventors: Arumugam Manthiram; Harris L. Marcus; David L. Bourell, all of Austin, Tex.

[73] Assignee: Board of Regents, The University of Texas System, Austin, Tex.

[*] Notice: The portion of the term of this patent subsequent to Sep. 15, 2009 has been disclaimed.

[21] Appl. No.: 44,971

[22] Filed: Apr. 8, 1993

Related U.S. Application Data

[63] Continuation-in-part of Ser. No. 951,349, Sep. 25, 1992, Pat. No. 5,296,062, which is a continuation of Ser. No. 814,715, Dec. 30, 1991, abandoned, which is a continuation of Ser. No. 559,338, Jul. 30, 1990, Pat. No. 5,076,869, which is a continuation of Ser. No. 402,694, Sep. 5, 1989, Pat. No. 4,944,817.

[51] Int. Cl.$^6$ ............................................. B05D 3/06
[52] U.S. Cl. ................................. 427/555; 427/197; 427/265; 427/376.2; 427/376.3; 427/556
[58] Field of Search ............... 127/555, 556, 197, 226, 127/376.2, 376.3, 266, 265

[56] References Cited

U.S. PATENT DOCUMENTS

| | | | |
|---|---|---|---|
| 4,247,508 | 1/1981 | Housholder | 264/219 |
| 4,299,860 | 11/1981 | Schaefer et al. | 427/556 |
| 4,863,538 | 9/1989 | Deckard | 156/62.2 |
| 4,938,816 | 7/1990 | Beaman et al. | 156/62.2 |
| 4,944,817 | 7/1990 | Bourell et al. | 156/62.2 |
| 5,017,753 | 5/1991 | Deckard | 219/121.63 |
| 5,076,869 | 12/1991 | Bourell et al. | 156/62.2 |
| 5,147,587 | 9/1992 | Marcus et al. | 264/22 |
| 5,156,697 | 10/1992 | Bourell et al. | 156/62.2 |
| 5,182,170 | 1/1993 | Marcus et al. | 428/551 |

FOREIGN PATENT DOCUMENTS

| | | | |
|---|---|---|---|
| 56-024034 | 1/1981 | Japan | 427/556 |
| 61-210189 | 9/1986 | Japan | 427/556 |
| 63-086208 | 4/1988 | Japan | 427/556 |
| 2-004981 | 1/1990 | Japan | 427/556 |

OTHER PUBLICATIONS

Kazakos, et al., "Sol–Gel processing of cordierite: Effect of seeding and optimization of heat treatment," *J. Mater. Res.* vol. 5 (1990) pp. 1095–1103 (no month).

Komarneni et al., "Application of Compostionarlly Diphasic Xerogels For Enhanced Densification: The System $Al_2O_3$–$SiO_2$,"*Comm. Am. Ceramic. Soc.* (Jul. 1986), pp. C-155 and C-156.

(List continued on next page.)

*Primary Examiner*—Janyce Bell
*Attorney, Agent, or Firm*—Vinson & Elkins

[57] ABSTRACT

A method of fabricating three-dimensional objects in a layerwise fashion, and having high structural strength and high density, is disclosed. Methods are disclosed by which nanocomposite powders of ceramic-ceramic systems, ceramic-metal systems, ceramic-polymer systems, and metal-polymer systems are produced. Disclosed examples utilize solution chemistry approaches, such as sol-gel processing, by way of which a gel is produced which is then fired and milled to form a powder suitable for selective laser sintering, where a laser fuses selected portions of layers of the powders according to a computer-aided-design data base. The ultraheterogeneity of the powder results in larger surface area and grain boundaries of the constituents, which enhances the solid state diffusion mechanism, and thus reduces the time and temperature required for sintering to occur. In addition, the higher stored metastable energy of the nanocomposite powder is believed to enhance densification during solid-phase sintering. Objects of high density of complex shape may thus be obtained directly from CAD data base design representations.

13 Claims, 1 Drawing Sheet

OTHER PUBLICATIONS

McCandlish et al. "Control of Composition and Microstructure in the Co–W–C System Using Chemical Synthesis Techniques," *Solid State Ionics* vol. 32, No. 33 (1989), pp. 795–801 (no month).

Wonterghem et al. "Formation of Ultra-Fine Amorphous Alloy Particles by Reduction in Aqueous Solution," *Nature* vol. 322, No. 14 (1986) pp. 622–623 (no month).

Lee et al., "Low-temperature synthesis of aluminum nitride via liquid–liquid mix carbothermal reduction," *J. Mat. Sci. Lett.* 9 (1990) pp. 1389–1391 (no month).

Deschamps et al., "New Chemical One-Step Process For Preparing Fine Metallic Particles embedded in a Polymer Matrix" *J. Mater. Chem.* vol. 2 (1992), pp. 1213–1214 (no month).

Su et al., "Polymer Precursor Route to $TiB_2/TiN$ Nanocomposites", *Chem. Mater.* 1992, 4, pp. 1141–1144 (no month).

Corrin, et al., "The Thermal Conversion of Poly [(silylene)–diacetylene]Metal Oxide Composites: A New Approach to B–SiC–MC Ceramics," *Angew. Chem. Int. Ed. Engl.* 1992, 31, No. 9, pp. 1195–1197 (no month).

Komarneni, "Nanocomposites," *J. Mater. Chem.* 1992, 2(12), pp. 1219–1230, (no month).

Brinker, et al., *Sol–Gel Science,* (Academic Pres, 1990), pp. 674–742 (no month).

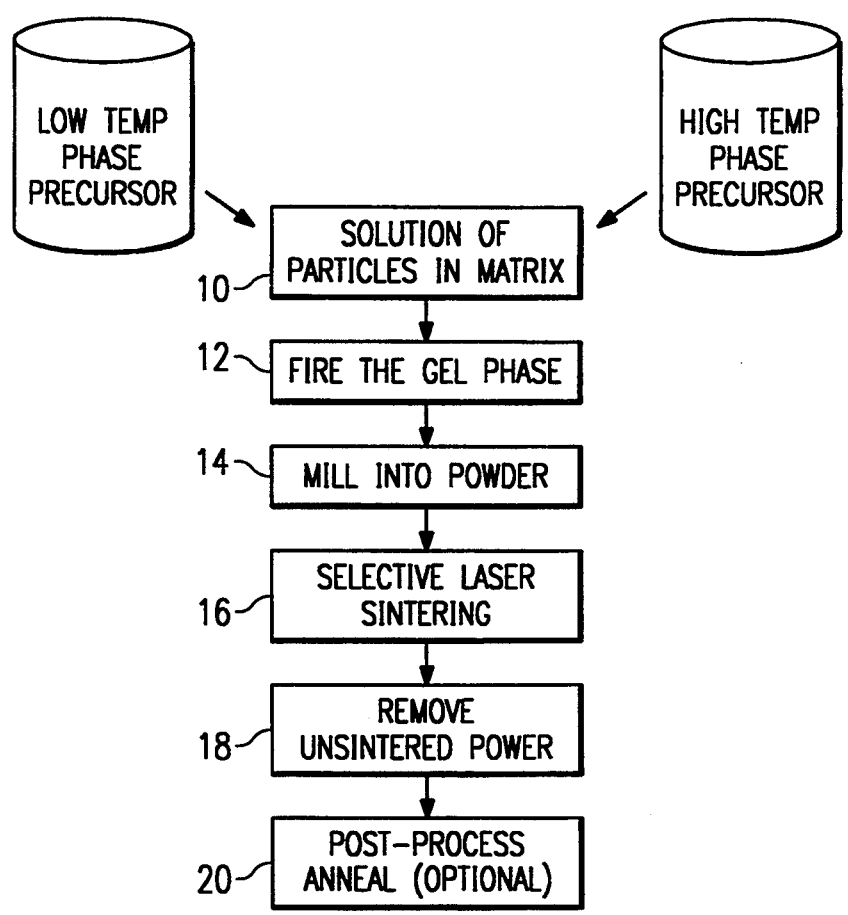

SELECTIVE LASER SINTERING USING NANOCOMPOSITE MATERIALS

This application is a continuation-in-part of application Ser. No. 07/951,349, filed Sep. 25, 1992, now U.S. Pat. No. 5,296,062 which is a continuation of application Ser. No. 07/814,715, filed Dec. 30, 1991, now abandoned, which is a continuation of application Ser. No. 07/559,338, filed Jul. 30, 1990, now U.S. Pat. No. 5,076,869, issued Dec. 31, 1991, which is a continuation of application Ser. No. 07/402,694 filed Sep. 5, 1989, now U.S. Pat. No. 4,944,817 issued Jul. 3, 1990.

This invention is in the field of solid free-form fabrication of three-dimensional objects, and is more particularly directed to composite powders used in the same.

BACKGROUND OF THE INVENTION

A significant portion of the product design cycle of many modern manufactured products is the time required to build and test prototype parts. Fast turnaround machine or prototype shops are used to produce prototype parts useful in the development of the manufactured product. One popular method of producing prototype parts in such shops is the subtractive machining of a block of material until the part matches the dimensions in a mechanical design. As is well known, the accuracy with which the machined prototype part matches the design can widely vary, primarily according to the skill of the machinist. In addition, the ability of subtractive processing to produce parts of complex shape is limited, and the time required for the machining of the part can be quite lengthy. As such, the product design cycle depending upon subtractive machining of prototypes is often lengthy, delaying the time-to-market of the eventual manufactured product.

Accordingly, new methods for the producing of parts, especially prototypes, have been developed in recent years to enable the rapid manufacture of complex parts directly from computer-aided-design (CAD) data bases. A particularly successful and recently developed additive process is commonly referred to as selective laser sintering. According to the selective laser sintering process, a laser is scanned in raster fashion over a layer of fusible powder, and modulated on and off, to fuse selected portions of the layer according to a cross-section of the desired part. After the fusing of the desired portions of a layer, another layer of powder is placed and similarly selectively fused, with fused portions of the later layer fusing to fused portions of the previous layer. Continued layerwise processing in this manner results in a part which can be quite complex in the three-dimensional sense.

The selective laser sintering process is described in detail in application Ser. No. 07/951,349, filed Sep. 25, 1992, now U.S. Pat. No. 5,296,062 and in the above-referenced U.S. Pat. Nos. 5,076,869, issued Dec. 31, 1991, and 4,944,817 issued Jul. 30, 1990, all assigned to Board of Regents, The University of Texas System, and incorporated herein by this reference. The selective laser sintering method is also described in U.S. Pat. No. 4,863,538, issued Sep. 5, 1989, U.S. Pat. No. 5,017,753 issued May 21, 1991, and U.S. Pat. No. 4,938,816 issued Jul. 3, 1990, all also assigned to Board of Regents, The University of Texas System and incorporated herein by this reference, and in U.S. Pat. No. 4,247,508, assigned to DTM Corporation, also incorporated herein by this reference.

By way of further background, U.S. Pat. No. 5,156,697 issued Oct. 20, 1992, U.S. Pat. No. 5,147,587 issued Sep. 15, 1992, and U.S. Pat. No. 5,182,170 issued Jan. 26, 1993, all also assigned to Board of Regents, The University of Texas System and incorporated herein by this reference, as well as the other referenced U.S. Patents noted hereinabove, describe the selective laser sintering of various materials and combinations of materials such as plastics, waxes, metals, ceramics, and the like. In particular, the selective laser sintering method has been especially beneficial in the production of molds or cores useful in investment casting. For example, a part formed of a low-temperature wax by the selective laser sintering process may be used in the well-known "lost wax" method of forming an investment casting mold.

The above-referenced U.S. Pat. Nos. 5,156,697 and 5,182,170 each describe selective laser sintering methods for producing parts from high temperature materials, and thus which may be useful in directly forming an investment casting mold. In the processes described in each of these patents, the laser irradiation either causes or facilitates a localized chemical reaction at the irradiated location of the powder, either among powder constituents or between the powder and the surrounding atmosphere. The processes described in these patents are referred to as selective laser reactive sintering ("SLRS").

For purposes of the description herein, the term "selective laser sintering" is intended to include selective laser reactive sintering, as well as selective laser sintering where the fusing mechanism is sintering of the liquid-phase (i.e. in which localized melting of the powder occurs) or solid-phase type.

By way of further background, another method for producing parts of high temperature materials, such as high temperature ceramics and ceramic composites, utilizes a powder of polymer-coated ceramic, such as described in the above-referenced U.S. Pat. Nos. 5,076,869 and 4,944,817. As described in these Patents, after the formation of a part by flowing the polymer coating to bind particles of a high temperature material, the part is subjected to a post-process anneal in which the polymer coating dissociates and the remaining particles of the high-temperature material sinter together and form the part.

By way of still further background, application Ser. No. 07/854,246, filed Mar. 20, 1992, now U.S. Pat. No. 5,284,695 assigned to The University of Texas System, and incorporated herein by reference, describes another selective laser sintering method which forms a "green" part, or preform, from a spray-dried powder of ceramic or metal particles coated with a polymer. According to this method, because the high temperature particles are incompletely coated with the polymer in the spray drying process, subsequent impregnation of the green part with a binder fuses the high-temperature particles into an object of the same shape as the green part. Annealing of the part is then performed to drive off the polymer and yield a high temperature part defined by low temperature selective laser sintering.

By way of further background, several synthesis methods are well known in the art for preparing nanocomposite materials. These known methods include sol-gel processing, evaporation-condensation-decomposition methods, and high-energy ball milling, among others. The term "nanocomposite" conventionally refers to multiphase solids where the constituent particles are of a size of on the order of one to one hundred nanometers in diameter; in contrast, the terms "nanophase" and "nanocrystalline" refer to materials that are single phase solids of nanometer size.

It is an object of the present invention to provide a method of forming objects by selective laser sintering, where the objects may be formed of a high temperature material such as a ceramic or a metal.

It is a further object of the present invention to provide such a method using a powder in which sintering is enhanced in the selective laser sintering process or in a post-process cure.

It is a further object of the present invention to provide such a method where the resulting object is formed with a high density, and is therefore less vulnerable to defects such as microcracks, undesirable porosity, and distortion upon densification.

Other objects and advantages of the present invention will become apparent to those of ordinary skill in the art having reference to the following description together with the drawing.

SUMMARY OF THE INVENTION

The invention may be implemented into a process for forming an article from a nanocomposite powder. The nanocomposite powder includes multiphase solids including both low-temperature and high-temperature constituents having particles of a size generally on the order of less than 100 nanometers in diameter. The nanocomposite powder is formed with one of the constituents serving as the matrix phase. The object may then be formed by selective laser sintering in the conventional manner, followed by an optional post-process anneal. If the low-temperature constituent is a polymer, the post-process anneal may decompose the polymer to yield the high-temperature object.

BRIEF DESCRIPTION OF THE DRAWING

The FIGURE is a flow chart illustrating process steps according to a preferred embodiment of the invention that utilizes sol-gel processing.

DETAILED DESCRIPTION OF THE PREFERRED EMBODIMENT

The preferred embodiment of the invention is directed to a process of fabricating objects of complex three-dimensional shape directly from a computer-aided-design (CAD) data base representation of the object. As discussed above in the Background of the Invention, a well known technique for fabricating articles is commonly referred to as selective laser sintering, such as performed by the SINTERSTATION TM 2000 fabrication systems manufactured and sold by DTM Corporation of Austin, Tex.

Nanocomposite materials exhibit the property of ultraheterogeneity, also referred to as nanoheterogeneity, in which the constituents of the composite material are mixed on an extremely small scale ("nanoscale"). According to the preferred embodiment of the invention, a nanocomposite powder having constituents of different melting temperatures is utilized as the material for the selective laser sintering process. In one alternative, the solid phase in the nanocomposite is the high temperature constituent, and may be a metal, an inorganic ceramic, an organic compound, or combinations thereof; in this case, the matrix phase may be a polymer, or may also be a ceramic material. Alternatively, the matrix phase may consist of the high temperature material with the solid phase being the lower melting temperature material. In either case, the mixing of the constituents according to the preferred embodiment of the invention is on the nanoscale, with the resulting phase being crystalline, semicrystalline, or amorphous, with the amorphous phase being preferred for maximum density in the resulting object.

This nanoscale mixing of the constituents results in important advantages when the material is used in the selective laser sintering process, particularly relative to the structural strength and density of the object so formed. Firstly, the nanoscale mixing of the constituents results in larger surface area and grain boundaries than occurs in conventional materials. This increased particle surface area enhances the solid state diffusion of the particles when irradiated by energy, such as laser energy applied in the selective laser sintering process. This enhanced diffusion reduces the temperature at which sintering takes place, and also the time necessary to effect such sintering.

In fields other than selective laser sintering, nanocomposites (such as $Al_2O_3$—$SiO_2$, $Al_2O_3$—$TiO_2$, and $SiO_2$—$MgO$) have been observed to sinter near their theoretical densities. See e.g., Kazakos, et al., *J. Mater. Res.*, Vol. 5, p. 1095 (1990); and Komarneni et al., *J. Am. Ceram. Soc.*, Vol. 69, p. C-155 (1986). It is believed that nanocomposites store significantly higher metastable energy than do composite materials that are mixed on a larger scale, and that this additional metastable energy enhances densification of the composite material during solid-phase sintering. In addition, simultaneous crystallization and densification have been observed during the sintering of nanocomposite materials. This is in contrast to homogeneous nanophase materials which, due to their atomic scale mixing, may crystallize prior to densification and thus have a lower density structure (or else require a higher sintering temperature for the same density) relative to nanocomposites.

Because of these factors, it is believed that nanocomposite materials will provide significant advantages when applied to selective laser sintering (including selective laser reactive sintering), such advantages over homogeneous (atomic scale mixing) nanophase materials, and also over large scale composite powders such as described in the above-referenced U.S. Pat. Nos. 5,076,869 and 4,944,817.

Referring now to the FIGURE, a process for fabricating an object according to the preferred embodiment of the invention will now be described in a generalized fashion, following which a number of examples and alternatives will be described in more specific detail.

In process 10 of the method of the FIGURE, multiple constituent materials are introduced into a solution which, upon further processing, will produce a nanocomposite. These materials introduced into solution may themselves be the constituents of the resulting object, but these materials will generally include one or more precursors (i.e., starting materials) for the resulting constituent materials in the nanocomposite powder. One or more of the constituents in the powder may be a precursor to a material in the finished object, particularly where the fusing mechanism is selective laser reactive sintering or where a spinel oxide or other compound is formed, as will be described in further detail hereinbelow.

According to the preferred embodiment of the invention, the different phases of the nanocomposite will have different melting temperatures. While the following description refers to binary nanocomposite systems, it is of course to be understood that the present invention may be implemented with any number of constituents. The higher melting temperature constituent may be a metal, ceramic, or composite material. The lower melting temperature constituent may be a polymer; alternatively, depending upon the high melting temperature constituent selected, the lower melting temperature constituent may be a metal or a ceramic material. Usually, the solution will be constituted using precursors to the desired constituents of the nanocomposite, as opposed to the nanocomposite constituents themselves. The solution of process 10 will generally include such other reagents necessary to disproportionate the materials in the solution into the desired state, where the constituent materials are in nanosize solid form, and where one of the constituent materials will serve as the matrix phase after processing is completed.

It is contemplated that most of the material systems utilizing the present invention will have the high temperature constituent as the solid phase material and the low temperature constituent as the matrix phase. It is further contemplated, however, that in some useful systems the matrix phase may alternatively consist of the high melting temperature constituent. In either case, the nanoscale mixing of the constituent materials provides the advantages of enhanced sintering, improved density and other beneficial properties of the present invention.

The solution resulting from process 10 is then allowed to form into a gel phase, which is subsequently subjected to a firing in process 12 to form the nanocomposite. The nanocomposite material from process 12 may then be milled, in process 14, to form a powder of the desired particle size. Each particle of the powder will thus contain the nanocomposite mixture of the low temperature and high temperature materials. The powder produced by process 14 is then ready for use in a system for performing selective laser sintering or selective reactive laser sintering, such as the SINTERSTATION TM 2000 system manufactured and sold by DTM Corporation, preferably modified so that the chamber may be maintained with an appropriate atmosphere at an elevated temperature of on the order of hundreds of degrees Celsius.

Selective laser sintering is then carried out in process 16 to form a three-dimensional object from a CAD data base representation in layerwise fashion, in the manner described in the above-referenced U.S. Pat. Nos. 5,076,869, 4,944,817, 4,863,538, 5,017,753, 4,938,816, and 4,247,508. Briefly, the selective laser sintering process is performed by dispensing a layer of the nanocomposite powder produced by process 16 over a target surface to a desired thickness, and then directing a laser, such as a 100 watt NdYAG laser or a conventional $CO_2$ laser, at the locations of the powder layer that correspond to the cross-section of the object(s) to be formed in that layer. The powder at the irradiated locations is heated so as to fuse, for example by solid-phase sintering, into a mass. Upon completion of the laser scanning of the layer, a subsequent layer of nanocomposite powder is placed over the prior layer, supported by both the fused and unfused powder, and the laser irradiation repeated to define the cross-section of the object to be formed in the next layer. The process is repeated until the object is completely formed, surrounded by unfused powder. The presence of the unfused powder enables the formation of overhanging structures, without requiring additional support structures or webs to support the solid layer.

According to the preferred embodiment of the invention, the low temperature constituent of the nanocomposite material melts, or undergoes solid-phase sintering, when irradiated by the laser in the selective laser sintering process. This melting or sintering, followed by cooling upon cessation of the laser irradiation at the fused location, causes the formation of a solid mass at the irradiated locations. This mass includes particles of the high melting temperature material bound by a solidified mass of the low melting temperature material. In addition, it has been found that, depending upon the material system used, the selective laser sintering operation of process 16 may cause a chemical reaction in the nanocomposite powder at the irradiated locations, with the resulting compound or intermetallic becoming part of the object being formed.

Upon definition of the object by the selective laser sintering process, the unfused nanocomposite powder surrounding the object so formed is removed in process 18 to yield the object formed by the process having the desired size and shape. This removal is conventionally done in a manual fashion.

Depending again on the material system selected, the object formed by processes 16, 18 may be a "green" part, or preform, requiring additional curing or other post-processing in order to form the object of the desired structural integrity. A conventional post-process is an anneal, shown as process 20 in the FIGURE, where the object is baked at a high temperature for a selected period of time. Such post-processing may serve to more completely sinter the constituent materials in the object; for example, the high temperature constituent of the fused nanocomposite may sinter into a unitary mass as a result of such an anneal. The anneal of process 20 may also drive off the low temperature constituent simultaneously with the sintering of the high temperature constituent, as occurs where the low temperature constituent is a polymer. The object is then formed with the desired structural characteristics.

Alternatively, the part formed by the selective laser sintering of processes 16, 18 may have sufficient structural integrity to serve as the prototype part, in which case the post-process anneal of process 20 is not performed.

The use of nanocomposite material according to the present invention provides significant advantages in the field of solid free-form fabrication, as noted above. The larger surface area and grain boundaries of the constituents, as compared to those in conventional powders, enhances the solid state diffusion mechanism, and thus reduces the time and temperature required for sintering to occur. In addition, the higher stored metastable energy of the nanocomposite powder is believed to enhance densification during solid-phase sintering. Furthermore, simultaneous crystallization and densification are enabled by use of nanocomposite material in the selective laser sintering operation, resulting in high density solids.

Specific alternative nanocomposite material systems useful according to the preferred embodiment of the invention will now be described in detail. These systems include ceramic-ceramic composites, ceramic-metal composites, and composites of polymer with either metal or ceramics.

Ceramic-Ceramic Composites

Ceramic-ceramic nanocomposites, with one ceramic constituent having a substantially lower melting temperature than the other, are believed to be particularly applicable for forming full density objects (i.e., objects with low porosity) in the selective laser sintering or selective laser reactive sintering processes.

EXAMPLE 1

Aluminum oxide, or alumina, is a commonly used ceramic material for many structural applications, particularly because of its high melting temperature of 2050° C. According to this example, a nanocomposite powder of aluminum oxide with a transition metal oxide with a melting temperature lower than that of alumina is produced. Examples of metal monoxides include FeO (melting point of 1380° C.), CoO (melting point of 1795° C.), NiO (melting point of 1984° C.), and CuO (melting point of 1326° C.). The lower melting temperatures of these transition metal oxides will enable selective laser sintering of the powder containing alumina so that a green part can be formed with reasonable laser power. In addition, when the metal of the transition metal oxide is Fe, Co or Ni, heating of the nanocomposite will cause reaction of the constituents into an intermediate spinel phase with a higher melting temperature than either constituent (in the case of spinel phases $FeAl_2O_4$ and $CoAl_2O_4$). In the case of spinel phases $CoAl_2O_4$ and $NiAl_2O_4$, a distinctive color (i.e., deep blue) results, adding a distinctive color to the object being produced; indeed, $CoAl_2O_4$ is a well-known coloring agent for glass.

Referring to the transition metal oxide as $M_xO_y$ (M representing the metal), the nanocomposite $Al_2O_3$—$M_xO_y$ may be produced as a gel-derived powder using conventional sol-gel processing. In the case where M is cobalt, aluminum secbutoxide in a solution of isopropyl alcohol was mixed with water at 70° C., and maintained at a pH of 2 by the addition of dilute nitric acid. To this solution, 1M cobalt nitrate solution was added under constant stirring at a temperature of 80° C., resulting in a gel which was then fired at 580° C. X-ray diffraction analysis verified that $Co_3O_4$ was indeed present in a sample prepared in this manner, with the $Co_3O_4$ having particle sizes of on the order of 50 nm in diameter; aluminum oxide appeared in the analyzed sample as an amorphous phase with significantly smaller particles than those of the $Co_3O_4$.

It is known that elemental cobalt generally forms $Co_3O_4$ at temperature during the firing of sol-gel derived powders above 500° C. As a result of the firing step noted above, therefore, the nanocomposite powder after firing will be a system of $Al_2O_3$—$Co_3O_4$. However, $Co_3O_4$ will disproportionate to CoO at temperatures above 1000° C., so that the irradiation of the nanocomposite $Al_2O_3$—$Co_3O_4$ will produce a system of $Al_2O_3$—CoO.

After firing of the gel, it is preferred to mill the nanocomposite powder for 30 minutes, so that the powder will remain intact when subjected to high laser power. Selective laser sintering may then be performed in the conventional manner, except that it is preferred that the powder remain at an elevated temperature in situ during the selective laser sintering process. Under these conditions, in an actual experiment, the spinel intermediate phase of $CoAl_2O_4$ was observed in the resulting fused mass, as the color of the fused nanocomposite changed from black to deep blue. As such, the use of this system can result in the coloration of the resulting part.

It is believed that the density of the object produced by the selective laser sintering of $Al_2O_3$—CoO nanocomposite will be further increased by a post-process anneal of the green part at elevated temperatures. The resulting object will thus be formed of alumina with varying amounts of the blue $CoAl_2O_4$ spinel oxide.

It is believed that nanocomposites of alumina and the other transition metal oxides FeO, NiO and CuO may be formed in an analogous manner to that of the $Al_2O_3$—CoO system described in this example.

EXAMPLE 2

Zirconia-based ceramics are commonly used as structural materials, and also as oxide-ion electrolytes in systems such as oxygen pumps and solid oxide fuel cells. According to this embodiment of the invention, a zirconia-based system utilizing alumina as the low melting temperature constituent and $ZrO_2$ (with its melting point of 2700° C.) as the high temperature constituent is believed to be useful in the selective laser sintering of objects.

For example, a $Al_2O_3$—$ZrO_2$—$Y_2O_3$ nanocomposite has been synthesized by adding ammonium hydroxide to a solution containing appropriate quantities of $Al^{3+}$, $Zr^{4+}$ and $Y^{3+}$. The resulting gel, after filtering and washing with distilled water, was fired at approximately 500° C. and milled for 30 minutes. Selective laser sintering under in situ heating was then performed, in which melting and sintering was observed.

For this system, it is preferred that the laser power be limited so that the local temperature of the irradiated powder remains below the boiling temperature of alumina, which is 2980° C. It is contemplated that such temperature control and laser power control can be determined by conventional process definition and optimization techniques.

Alternatively, $ZrO_2$—$Y_2O_3$ is another known zirconia ceramic-ceramic system producible in nanocomposite form by well-established sol-gel procedures. Considering that both $ZrO_2$ and $Y_2O_3$ have extremely high boiling points, this system will have a less critical upper limit on the laser power used in the selective laser sintering process. However, the higher melting point of $Y_2O_3$ (at 2410° C.) will require additional laser power or higher in situ temperatures to effect the sintering mechanism.

Further in the alternative, an alternative alumina-based nanocomposite system utilizing MgO as the other constituent may also be formed by conventional sol-gel processing. While the melting point of MgO (at 2852° C.) exceeds that of alumina, an intermediate spinel phase of $MgAl_2O_4$ is known to form; this spinel phase has an intermediate melting temperature of 2100° C. Considering that each of the constituents $Al_2O_3$, MgO and $MgAl_2O_4$ are well known high temperature structural ceramics, it is contemplated that the $Al_2O_3$—MgO system will also be a useful nanocomposite in the selective laser sintering of three-dimensional objects according to the preferred embodiment of the present invention.

Ceramic-Metal Composites

Ceramic-metal composite materials provide a particularly useful combination in the fabrication of prototype and actual parts. In particular, the ceramic constituent provides high temperature strength while the metal constituent adds durability to the finished product. It is contemplated that the present invention will also be useful in the fabrication of dense objects from ceramic-metal systems, as discussed below relative to exemplary systems.

As discussed above relative to Example b 1, nanocomposites of $Al_2O_3$—$M_xO_y$ can be formed into a powder suitable for selective laser sintering, where M is a metal selected from the group Fe, Co, Ni and Cu. Hydrogen reduction of either of these nanocomposite systems produces the ceramic-metal nanocomposite $Al_2O_3$—M, as is well known.

According to this embodiment of the invention, the powder for selective laser sintering would be formed by the hydrogen reduction of a selected alumina-transition metal oxide nanocomposite system, resulting in an alumina-metal nanocomposite. Considering that each of Fe, Co, Ni and Cu have a lower melting point than alumina (1535° C., 1495° C., 1455° C. and 1083° C. respectively), any of these metals will assist the sintering of the nanocomposite at reduced laser power or in situ temperature relative to the ceramic-ceramic systems described above.

It is further contemplated that the properties of green parts fabricated by the selective laser sintering of these ceramic-metal composites may be enhanced by the post-processing step of infiltration, or by conventional thermal-mechanical post-processing such as hot isostatic pressing.

The use of tungsten carbide-cobalt composite material for extremely hard surfaces, such as cutting tools, is well known. The extreme hardness provided by this system is controlled by the composition and microstructure of the composite, which of course depend on the synthesis and processing conditions. This feature has led to substantial work in the field of developing precursors for the synthesis of nanophase composite powders of WC—Co. As described in McCandlish and Pelizzotti, *Solid State Ionics*, vol. 32-33 (1989), p. 795, coordination compound [Co(en)$_3$]WO$_4$ (where "en" corresponds to ethylenediamine) has been identified as an attractive precursor from which nanocomposite particles of WC—Co may be produced. As described therein, this precursor [Co(en)$_3$]WO$_4$ is readily precipitated as a salt by adding an aqueous solution of CoCl$_2$ to a solution of tungstic acid in ethylenediamine. Upon obtaining the precursor compound [Co(en)$_3$]WO$_4$ in this manner, hydrogen reduction followed by carburization yields the nanocomposite WC—Co.

According to this embodiment of the invention, the WC—Co nanocomposite is used as the powder in a selective laser sintering operation, where the atmosphere in the selective laser sintering chamber is a carburizing atmosphere, for example a mixture of CO and CO$_2$. In the selective laser sintering of the WC—Co nanocomposite, the lower melting point Co constituent will aid sintering at the desired locations.

It is further contemplated that the substitution of other divalent cations as $Ni^{2+}$ or $Cu^{2+}$ for the $Co^{2+}$ in the precursor compound may result in beneficial results in the subsequent selective laser sintering operation.

Further in the alternative, the reduction of an aqueous solution of a metal salt with NaBH$_4$ or KBH$_4$ is known to result in fine particles of the elemental metal, as described in Wonterghem et al., *Nature*, vol. 322 (1986), p. 622. The incorporation of the boron into the solid metal results in ultrafine amorphous composite phases. The high melting point of boron (2300° C.) relative to any of the transition metals Cr, Fe, Co, Ni or Cu, allows the transition metal in a transition metal-boron nanocomposite to melt and aid the sintering process during selective laser sintering. In this example, the amount of boron concentration in the transition metal can be controlled by the adjustment of the relative concentration of the metal salt and boron source (NaBH$_4$ or KBH$_4$) in the aqueous solution, and by the selection of the pH of the solution. Upon subsequent selective laser sintering, and depending upon the boron concentration in the nanocomposite, the resulting part may consist of either a metal/boron, metal-boride/metal or metal-boride/boron composite.

Polymer-Ceramic and Polymer-Metal Composites

As described in the above-referenced U.S. Pat. Nos. 5,076,869 and 4,944,817 and copending application Ser. No. 07/854,246, filed Mar. 20, 1992, composite materials including polymer constituents are particularly attractive in the selective laser sintering field. This is due to the mechanical flexibility and glass transitions associated with polymers, which allow the selective laser sintering mechanism to occur at lower temperatures, and thus with lower laser power. In addition, the low decomposition temperature of polymers enables the formation of a ceramic part by way of a post-process anneal at a relatively modest temperature. The resulting ceramic part will substantially maintain the shape and dimensions of the preform.

Furthermore, polymers can act as sources of atomic carbon, nitrogen, oxygen or boron, among others, and are thus useful in the generation of ceramics (either oxide or non-oxide) under relatively mild conditions and temperatures, while still obtaining ultraheterogeneity. The product provided by the decomposition of the polymer in a post-processing anneal may remain as a constituent (e.g., SiC, SiN) of the nanocomposite, or may react with other nanocomposite constituents. As a result, polymers may be used to generate a wide range of metal-ceramic and ceramic-ceramic nanocomposites, depending upon the selection of the polymer and synthesis conditions.

In particular, according to this example of the preferred embodiment of the invention, nanophase metal oxides or nanophase metals are produced in a polymer matrix by one of two mechanisms. These mechanisms include the simultaneous polymerization and ceramic/metal particle generation, and the dispersion of metal or ceramic particles in a solution containing polymers.

a. Simultaneous particle generation and polymerization

The hydrolysis of a metal alkoxide simultaneously with the polymerization of a monomer is known to produce nanophase metal oxides dispersed in a polymeric matrix, as described in Lee, et al., *J. Mat. Sci. Lett.*, Vol. 9 (1990) p. 1389. According to such a process, a metal oxide such as SiO$_2$, Al$_2$O$_3$, TiO$_2$, and ZrO$_2$ may be dispersed in a matrix phase consisting of a polymer such as poly(furfuryl alcohol).

Similarly, it has been found that the simultaneous chemical reduction of a transition metal ion to its metallic state with the polymerization of a monomer can produce nanophase elemental metal particles dispersed in a polymer matrix. Easily reducible transition metals such as Fe, Co, Ni and Cu may be so dispersed in a polyaniline polymer matrix, with a reducing solvent such as ethylene glycol as described in Deschamps et al., *J. Mater. Chem.*, vol. 2 (1992), p. 1213.

According to the preferred embodiment of the invention, the nanophase polymer metal or metal oxide composite powder synthesized according to the processes described hereinabove is then subjected to selective laser sintering. It is contemplated that the presence of the polymer matrix phase will provide significant advantages in the selective laser sintering process. Firstly, as noted above, the relatively low melting temperature of the polymer allows for low power lasers to sinter a green part, or preform; post-processing by way of anneal, binder impregnation, or both, can then be used to bind the ceramic particles into a structurally solid part of the same shape and dimensions as the preform.

Secondly, selection of the polymer type and the sintering atmosphere enables the formation of an object from oxide or nonoxide ceramics, examples of which include SiC, $Si_3N_4$, AlN, TiC, and TiN. For example, the nitride ceramics may be formed during selective laser sintering if the polymer contains nitrogen, or if the sintering is performed in a nitrogen-bearing atmosphere such as ammonia. In the case of nitride ceramics, it is contemplated that control of the nitrogen content in the polymer as well as the metal to polymer ratio will enable modulation of the metal nitride-to-metal carbide ratio in the final product. The polymer matrix may also be removed from the green part by way of a suitable solvent.

In addition to the ceramic parts noted above, similar nanocomposites of metal and polymer may be used to produce parts using selective laser sintering which are formed of metal, or an alloy, and which are of high density.

b. Particle dispersion in a solution containing polymers

According to yet another alternative embodiment of the invention, nanophase metal or metal oxide particles (or both) may also be dispersed in a solution containing the appropriate polymer. Gentle evaporation of such a solution will then yield a ceramic-polymer or metal-polymer nanocomposite suitable for selective laser sintering.

Similarly as described above, it is contemplated that either oxide or non-oxide ceramics may be produced during the selective laser sintering, or during a post-process anneal following selective laser sintering, depending upon the composition of the polymer and upon the processing atmosphere.

For example, dispersion of titanium metal in a tetrahydrofuran solution of polyborazylene is known to yield $TiN/TiB_2$ nanocomposites upon subsequent pyrolysis, as described in Su, et al. *J. Chem. Mater.*, vol. 4 (1992), p. 1139. It is believed that such nanocomposites may provide a variety of non-oxide ceramics, depending upon the nature of the polymer phase and the processing atmosphere, such ceramics including metal carbides, nitrides, borides and silicides, as well as composites of these refractory materials.

Alternatively, it is known that composites of metal oxides and silicon-containing polymers such as poly[(-silylene)diacetylene] will yield composites of SiC and other metal carbides such as TiC, ZrC, NbC, and $Mo_2C$, as described in Corriu, et al. *Angew. Chem.*, vol. 31 (1992), p. 1195. As above, it is contemplated that modulation of the relative amounts of the SiC and other carbides may be effected by variation of the concentration of the dispersed metal oxides in the polymer. Further in the alternative, it is contemplated that dispersion of $B_2O_3$ along with the other oxides will yield composites that contain SiC and other metal carbides in combination with borides.

It is contemplated that the nanocomposites including a polymer and metals or ceramics produced according to this mechanism will provide similar benefits in the producing of parts by selective laser sintering as discussed above.

Further in the alternative, while in the examples and alternatives described hereinabove produce the nanocomposite material by way of sol-gel processing, it is contemplated that other known techniques for producing nanocomposite powders may also be used. These techniques include, among others, evaporation-condensation-decomposition methods, and high-energy ball milling. It is contemplated that nanocomposite powders produced by these and other methods, when used in the selective laser sintering process, will also provide the benefits described hereinabove.

In addition, it is to be noted that the selective laser sintering processes applied to the nanocomposite powders according to the present invention include those selective laser sintering processes by which the fusing mechanism is liquid-phase or solid-phase sintering, and also include selective laser reactive sintering where a reaction is initiated at irradiated locations of the powder, such reaction among materials in the powder or between materials in the powder and the surrounding atmosphere.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of producing a three-dimensional object, comprising the steps of:
    applying a layer of a nanocomposite powder at a target surface, said nanocomposite powder comprising at least first and second constituent materials, said first constituent material having a lower melting temperature than said second constituent material;
    directing energy at selected locations of said layer corresponding to the cross-section of the object to be formed in said layer, to fuse particles of said first constituent material thereat;
    repeating said applying and directing steps to form the object in layerwise fashion; and
    removing unfused nanocomposite powder from said object.

2. The method of claim 1, further comprising:
    placing precursors for said first and second constituent materials in solution;
    forming a nanocomposite gel phase from said solution, said nanocomposite gel phase comprising said first and second constituent materials;
    firing said nanocomposite gel phase; and
    milling the fired nanocomposite gel phase to produce the nanocomposite powder comprising said first and second constituent materials.

3. The method of claim 1, wherein said first constituent material is the matrix phase of the object.

4. The method of claim 1, wherein said second constituent material is the matrix phase of the object.

5. The method of claim 1, further comprising:
heating the object after the step of removing the unfused nanocomposite powder.

6. The method of claim 5, wherein said first constituent material is a polymer;
and wherein said heating step removes the polymer from the object and fuses particles of said second constituent material to one another.

7. The method of claim 5, wherein said first constituent material is a polymer;
and wherein said heating step decomposes the polymer to provide a product phase remaining in the object.

8. The method of claim 2, further comprising:
wherein said first and second constituent materials are each a ceramic.

9. The method of claim 8, further comprising:
heating said nanocomposite powder during said directing energy step.

10. The method of claim 8, wherein said directing energy step also forms a spinel oxide.

11. The method of claim 2, wherein said first constituent material is a metal and said second constituent material is a ceramic.

12. The method of claim 11, further comprising:
after said step of removing the unfused nanocomposite powder, infiltrating the object with a fusing material.

13. The method of claim 2, wherein said first constituent material is a metal and said second constituent material comprises boron.

* * * * *